United States Patent

[11] 3,577,715

| [72] | Inventors | Lawrence M. Halls<br>New Holland;<br>Henry N. Lausch, Leacock, Pa. |
|---|---|---|
| [21] | Appl. No. | 813,182 |
| [22] | Filed | Apr. 3, 1969 |
| [45] | Patented | May 4, 1971 |
| [73] | Assignee | Sperry Rand Corporation<br>New Holland, Pa. |

[54] SUSPENSION FOR MOUNTING A HEADER ON A TRACTOR
9 Claims, 10 Drawing Figs.

| [52] | U.S. Cl. | 56/208 |
|---|---|---|
| [51] | Int. Cl. | A01d 67/00 |
| [50] | Field of Search | 56/21, 208, 23 |

[56] References Cited
UNITED STATES PATENTS
3,293,835  12/1966  Gehman et al. ............... 56/23

*Primary Examiner*—Robert Peshock
*Attorneys*—Joseph A. Brown, John C. Thompson, James J. Kennedy and George C. Bower ABSTRACT: A self-propelled agricultural harvesting machine has a link-type suspension mounting a crop cutting header on a tractor. The suspension comprises two spaced suspension assemblies each having upper and lower links and suspension springs supporting the header in cooperation with ground engaging skid shoes and moving the header on variations in ground level so that cut crops are discharged against the windrow- or swath-forming means underneath the tractor at substantially the same location and having deflection means for smoothly guiding end discharged crops from the long conditioning rolls to the narrower windrow and swath forming means.

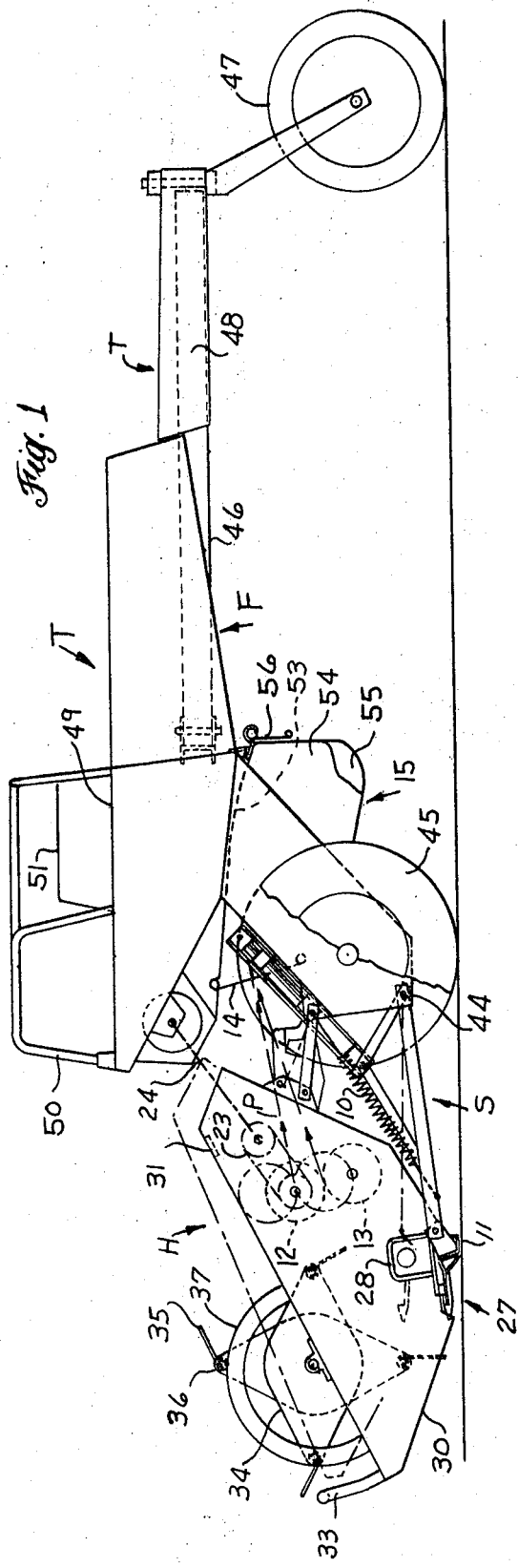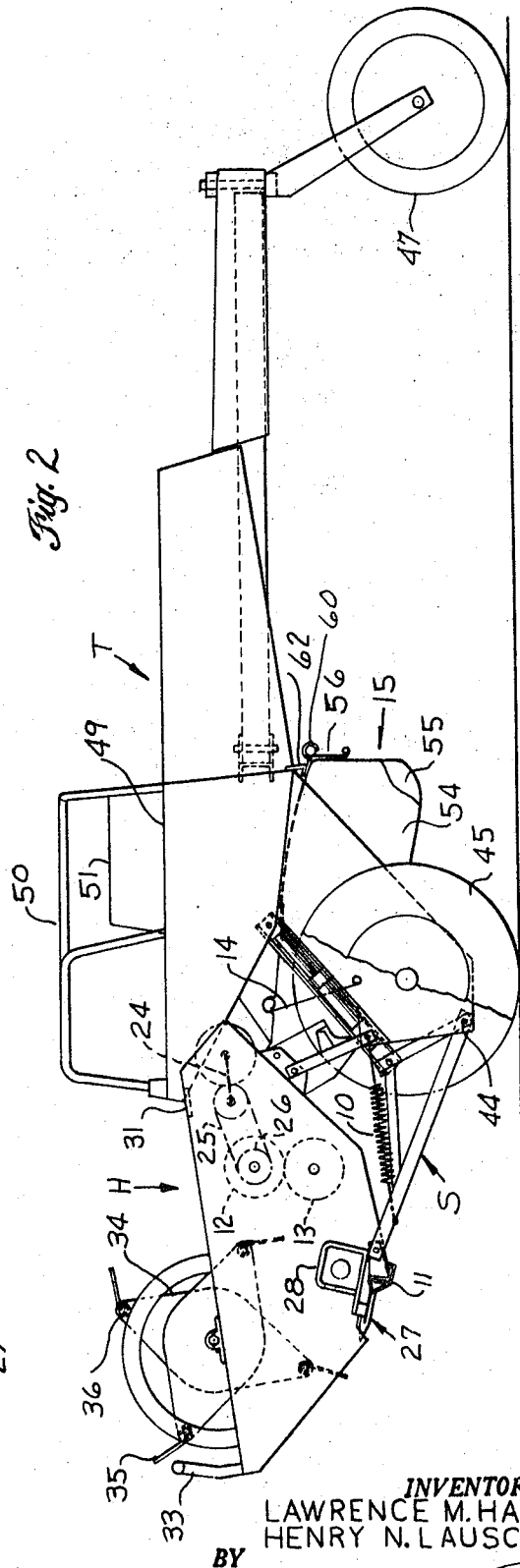

PATENTED MAY 4 1971

INVENTORS
LAWRENCE M. HALLS
HENRY N. LAUSCH
BY George C. Bower

INVENTORS
LAWRENCE M HALLS
HENRY N. LAUSCH
BY
George C. Bower

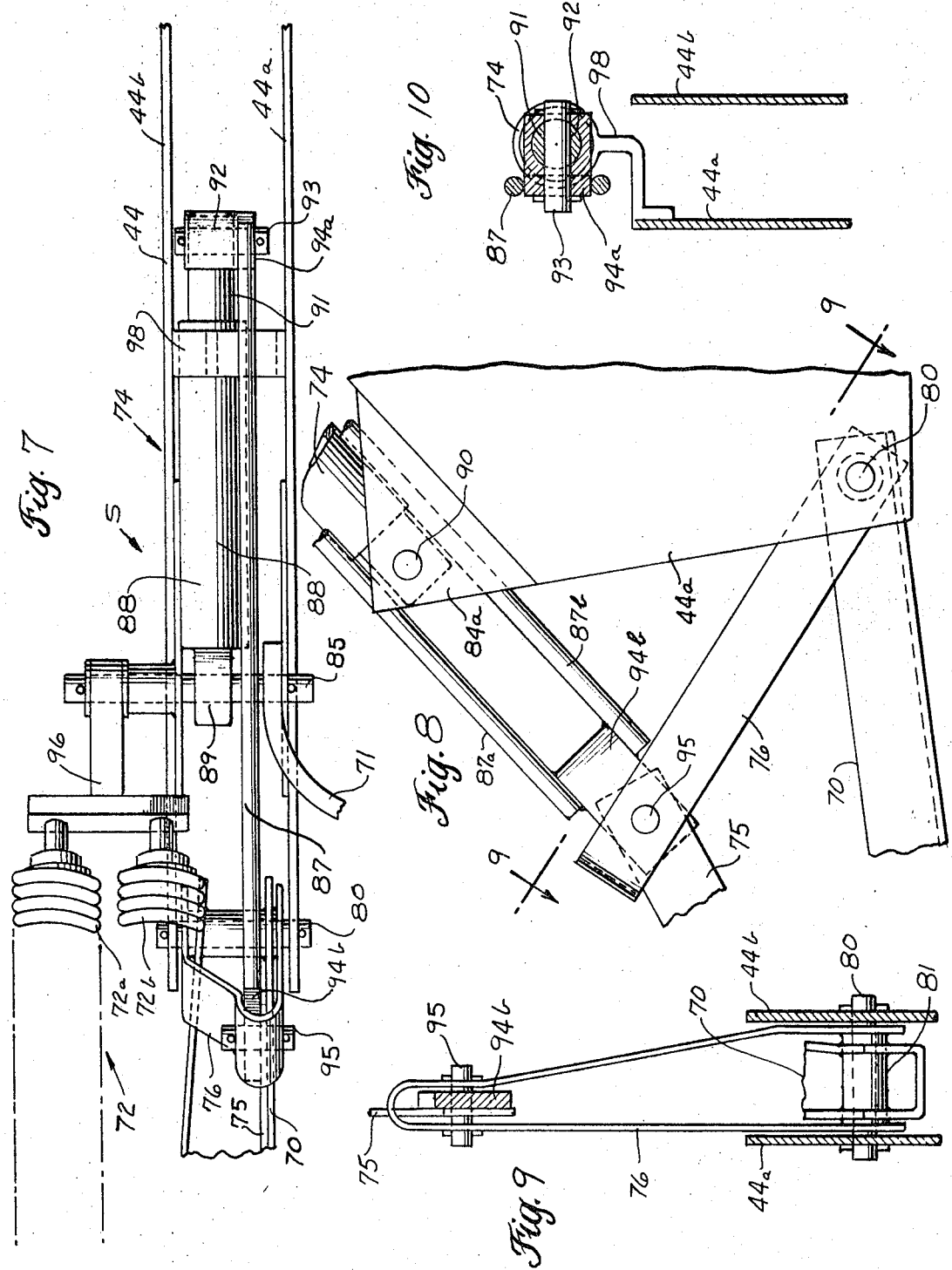

SUSPENSION FOR MOUNTING A HEADER ON A TRACTOR

BACKGROUND OF THE INVENTION

This invention relates to agricultural harvesting equipment and is particularly directed to the suspension supporting a header on a tractor and the transfer of cut crops from the header to the tractor for formation into windows or swaths.

Agricultural harvesting equipment of the self-propelled mower-conditioner type has the header mounted on the front of the tractor. The header has a sickle for cutting the crop and conditioning rolls for cracking the stems. The sickle is transversely wider than the tractor to cut a swath greater than the span of the wheels of the tractor so that the wheels do not damage standing crop. The conditioning rolls are generally as long as the sickle to provide a thin mat of crop material passing between the rolls. The window and swath forming means are mounted between the tractor wheels to drop the cut crops clear of the wheels. Thus the header crop discharge must be narrowed to flow properly into the windrow- and swath-forming means. This delivery of the discharge crops is also affected by the variation of the relation of the header and the tractor as the ground level changes. The suspension should support the header so that the crop discharge engages or enters the windrow- and swath-forming means in the same manner and over the same area as the ground level changes. Additionally the maximum width of the space between the header and tractor should be utilized for passing the crops into the windrow- and swath-forming means.

Another consideration is the distance the header extends forwardly of the tractor. The header should be mounted as close as possible to the tractor to reduce the forward weight of the header in relation to the center of the weight of the harvesting machine. Complementary to this it is also desirable to position the sickle bar close to and underneath the operator so that he can observe the cutting action. The further the header extends the greater the counterbalance to the rear of the drive wheels.

The purpose of this invention is to provide a suspension for supporting a mower-conditioning header on a tractor that meets these criteria of space and movement to properly deliver cut conditioned crops from the long conditioning rolls on an articulated header to narrower windrow- and swath-forming means on the propelling tractor.

OBJECTS AND SUMMARY OF THE INVENTION

An object of this invention is to provide a header suspension on a tractor that maximize the utilizable crop-passing space between header crop conditioning means and tractor supported crop-arranging means.

Another object of the invention is to provide a suspension of a header on a tractor with windrow- and swath-forming means that on relative movement of the header within the operating range the cut crops are discharged against the windrow- and swath-forming means at substantially the same place for consistency of windrow- or swath-forming action on variation in ground level.

Another object of the invention is to provide a suspension for supporting a header on a tractor that minimizes the forward projection and weight of the header.

Another object of this invention is to provide a suspension that supports a header close to the tractor for easy observance of the cutting action.

In summary this suspension for supporting a header on a tractor comprises two suspension assemblies each having upper and lower links and a two suspension spring means. The lower links are connected to the header below the crop conditioning rolls and the upper links are connected rearwardly and transversely exterior to the crop-conditioning rolls. The suspension springs are positioned below the level of the path of discharge of the crop material and the hydraulic lift is positioned clear of the path of discharge of the crop material.

These and other objects and advantages of this invention will be apparent from the following description and claims taken in connection with the accompanying drawing which illustrates the various features of this invention.

BRIEF DESCRIPTION OF THE DRAWINGS

FIG. 1 is a side elevational view of the tractor and header in the operating position.

FIG. 2 is a side elevational view of the tractor and header in the transport position.

FIG. 3 is an enlarged side elevational view of the linkage with the tractor and header fragmentarily shown.

FIG. 4 is a cross-sectional view of the U-shaped crop discharge deflector taken along lines 4–4 of FIG. 3.

FIG. 5 is a cross-sectional view of the left windrow shield taken along lines 5–5 of FIG. 3.

FIG. 7 is an enlarged top plan view of the mechanism for raising and lowering the header taken as indicated by the arrows 7–7 in FIG. 3.

FIG. 8 fragmentarily illustrates the suspension and connection to the tractor frame.

FIG. 9 illustrates the link between the mechanism raising and lowering the header and the tractor frame as viewed in direction of arrow 9–9 of FIG. 8.

FIG. 10 is a fragmentarily end view of the mechanism raising and lowering header as viewed in the direction of arrows 10–10 of FIG. 3.

DETAILED DESCRIPTION OF PREFERRED EMBODIMENT

Introduction

Figure 6:
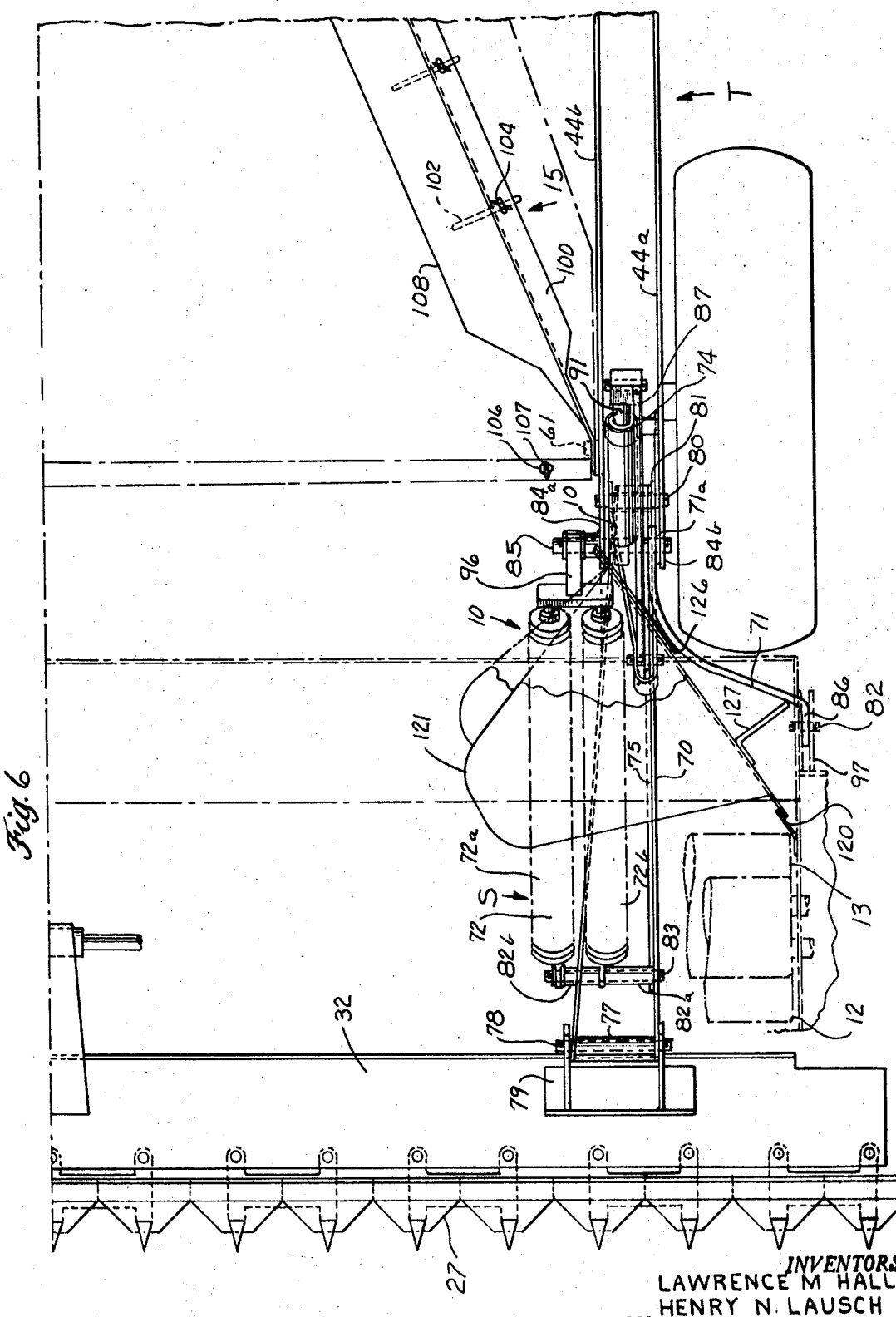
FIG. 6 is a top plan view of the suspension on the left side with the tractor and header fragmentarily shown.

As shown in FIGS. 1, 2 and 3 the harvesting machine comprises a header H mounted on the front of a tractor T by suspension S. The suspension comprises two transversely spaced suspension assemblies 10 pivotally connected to the header and to the tractor for supporting the header in cooperation with ground-engaging shoes 11 in crop cutting position and for raising the header into an inoperative transport position. The header cuts the crop, feeds it through upper and lower conditioning rolls 12 and 13 and discharges it against a swathing baffle 14 on the forward portion of the tractor to form the crop into swaths or into the longitudinally extending windrow forming means 15 beneath the tractor. The suspension S supports the header so that as the header moves through a range of crop cutting positions the discharged cut crops are discharged against substantially the same area of the swathing baffle or into the entrance of the windrow shields over the range of crop cutting positions.

Drive Means

The drive means for the header is schematically illustrated in FIG. 3. The belt 17 is driven by the motor source (not shown) around the pulley 18 to drive the pulley 19 mounted on the same shaft. The pulley 19 is connected by a belt 20 to the pulley 21 in the header drive housing 22 at the front end of the tractor. The pulley 21 is connected to the pulley 23 on the left side of the header 11 by a power take off shaft 24 (FIGS. 1 and 2). The pulley 23 (FIG. 3) drives the upper conditioning roll 12 by means of the belt 25 and pulley 26 so that the conditioning rolls 12,13 rotate in opposite directions for conditioning the crop and discharging it from the rear of the header H. The sickle 27 is driven by a conventional wobble plate drive 28.

Header

The header H has a longitudinally extending transversely spaced side members 30 and a transversely extending beam 31 at the upper and tractor end of the header. The cutting bar 32

(FIG. 3) extends transversely across the bottom of the header and is attached to the side members 30. The cutting sickle or bar 27 is mounted on the lower beam. Extending across the front of the header are a crop-engaging bar 33 (FIGS. 1 and 2) and a pickup reel 34. The reel is rotatably mounted on the side members 30 and has tines 35 on tine bars 36 which engage the roll-type cam follower 37 and turn and rotate the tines for sweeping the crops into the cutting sickle and up the crop guide plate 38 (FIG. 3) into the conditioning rolls 12,13.

The conditioning rolls 12,13 (FIG. 6) extend the transverse length of the header and are rotatably mounted in the sides of the header. The lower roller shaft 43 is fixed. The shaft 42 of the upper roller moves in a limited arc about the center of the drive pulley 23 connected to the power takeoff shaft 24. The limited movement permits adjustment to the thickness of the crop mat and passage of debris such as rocks. The rolls rotate at a high speed with the crop-engaging portions moving rearwardly to discharge the cut crop in a trajectory P through the open back of the header. The axes of rotation of the conditioning rolls 12,13 are in a forwardly tilted generally vertical plane C to impart an upward component to the trajectory P of the discharged crops.

Tractor

The tractor is a self-propelled type and has a frame F with transversely spaced casing members 44 extending downwardly and forwardly for supporting the frame on the front drive wheels 45. The drive wheels 45 are positioned on the outer sides of the frame or casing members 44. A tail assembly has a beam 46 mounted on and attached to the frame F and extending from the rear with a steering or tail wheel 47 pivotally mounted at the rear end. A ballast trough or weight pan 48 sets on and is secured to the beam between the tail wheel and the frame. The ballast trough or weight pan 48 may carry weights for offsetting the weight of the header H so that the center of weight of the self-propelled harvesting machine is located slightly to the rear of the drive wheels.

The operator's platform 49 is positioned on the left side of the tractor and above the front wheels with a control pedestal 51 at the center. Guard rails 50 are provided to enclose the operator space. A power source (not shown) is mounted on the right side of the tractor to the rear of the operator's platform.

Beneath the main portion of the frame F and between the spaced casing or frame members 44 is the generally trough-shaped windrow-forming means 15 extending longitudinally to receive cut crops from the header H and deposit them on the ground in a windrow. At the forward portion of the windrow-forming means 15 is the pivotally mounted swathing baffle 14 blocking the passage through the windrow shields and deflecting cut crops downwardly to lay a swath on the ground between the drive wheels.

The windrow-forming means 15 comprises a top plate 53, (FIG. 3, 5 and 6) two windrow shields, 54, and a fluffing baffle 56 (FIG. 1). The top plate 53 has a forward mounting plate portion 57 and the crop-engaging portion 58, a semicylindrical bead 59 extends between the mounting portion 57 and the crop-engaging portion 58 for pivotally receiving the swathing baffle 14. At the rear edge of plate 53 there is a second semicylindrical bead 60 for pivotally receiving the fluffing plate 56. The top plate 53 is secured to the tractor frame F by brackets 61 secured to the inner sides of the frame members and by L-shaped straps 62 at the rear. The front mounting plate portion is secured to front panels 63 on each side of the header drive housing 22.

The windrow shields 54 (FIG. 5) are of generally J-cross-sectional configuration and have upper flanges 100 for mounting the windrow shields on the top plate 53. The top plate has slots 102 for receiving the fastening means 104 and permitting the windrow shields to be positioned over a range of angles to the direction of movement of the harvesting machine. The windrow shield 55 on the right is more sharply curved than the windrow shield on the left. The windrow shields at the forward end are attached to the brackets 61 also supporting the top plate 53.

The swathing baffle 14 (FIG. 3) has a cylindrical tubular portion 105 fitting in the semicylindrical bead 59 of the top plate 53 and has fastening means 106 extending through circumferential extending slots 107 for securing the swathing baffle to the top plate while permitting limited angular movement from a generally vertical downward position to a generally horizontal upward position. The swathing baffle 14 has sloped edges 108 narrowing the baffle toward the ground. An L-shaped bracket 109 is attached at the center of the baffle and an extended lever 110 is pivotally attached to the bracket 109 for raising and lowering the baffle from above the operator's platform by means of a triangular-shaped gripping means 111. The handle has notches 112 for retaining the swathing baffle over a range of positions from generally vertical to generally horizontal. The swathing baffle is positioned generally above the center rotation of the drive wheel. In the downward vertical position the swathing baffle is tilted rearward at a slight angle and extends from above the top conditioning roll to below the horizontal plane through the engaging sides of the crop conditioning roll. The swathing baffle is just in front of the forward edges of the windrow shields so that the windrow shields do not obstruct downward deflection of the crop material onto the ground.

Suspension

The suspension S (FIG. 3) comprises two identical transversely spaces suspension assemblies 10. Each suspension assembly 10 comprises a lower link 70 and an upper link 71, a lift springs 72, a hydraulic lift 74 and two extension members 75,76 connected to the hydraulic lift 74 and the lower link 71. The lower and upper links are pivotally connected to the lower link 70 and form a part of the lower link in nonpivotal relation therewith to connect the lower link to the hydraulic lift 74. The lift springs 72 are pivotally connected to the tractor T and the header H.

The lower link 70 (FIG. 7) is of an upwardly facing U-shape and tapers toward the tractor with the bottom on the ground side. At the header end the cylindrical member 77 between the sides of the lower link 70 has a bore for receiving the pin 78 which extends through the U-shap bracket 79. The bracket is securely fixed on the cutting bar 32. A similar construction is at the other end of the link with the pin 80 extending through a cylindrical member 81 between the sides of the lower link and the walls 44a, 44b of the frame member 44 of the tractor. The cylindrical members 82a, b to which the helical lift springs 72 are connected, have bores for receiving the pivot pin 83 connecting the frame member and the lower link. The pin 83 extends to one side so that the inner helical spring is connected outside the link and the outer helical spring is connected to the pin between the sides of the lower link and the cylindrical members 82a, b.

The upper link 71 (FIG. 6) is curved in unsymmetrical S-shaped configuration. At the tractor T the longitudinally extending end 71a is positioned between the plates 84a, b of an intermediate bracket 84 extending forwardly from the sides of the frame member 44 and pivotally connects thereto by a pin 85 extending through the plates. The link curves in front to the wheel and has the forward longitudinal end 86 positioned between the plates of the bracket 97 attached to the side of the header transversely beyond the conditioning rolls 12,13. The upper link 71 in the operating position is on the level of the bite of the conditioning rolls 12,13 and spaced longitudinally rearward from the rolls. In the operating position the upper link is nearly horizontal with the forward end slightly raised. The intermediate bracket 84 and the upper link-header bracket 97 are generally at the same level as the level of the crop-engaging portion of the conditioning rolls 12,13.

The lower link 70 and the two extension members 75,76 form a three piece link which is connected at its apex to the connecting rod 87 of the piston of the hydraulical lift 74. The shape of these three triangular pieces remains the same as the hydraulic lift rotates the shorter link and lifts the lower link on raising of the header to the transport position as shown in FIG. 2.

The hydraulic lift 74 raises the header H through the lower links 70. As best illustrated in FIGS. 5 and 7 each of the frame members 44 comprise two sheet metal side pieces 44a, 44b spaced transversely apart. The hydraulic lift 74 and the links are pivotally positioned between these sheet metal pieces 44a, 44b with the pins extending through the sheet pieces. The hydraulic lift comprises a cylinder 88 supported by mountings 98 fastened to the sheet metal pieces 44a and the pin 90 passing through the eye 89 at the end of the cylinder. The cylinder 88 is fixed in position and does not move. The position 91 has a cylindrical opening 92 for receiving a pin 93 coupling the piston 91 to the connecting rod 87 which at the other end is pivotally connected to the extension members 75,76. The connecting rod 87 comprises two parallel shafts 87a, 87b (FIG. 8) rigidly secured to blocks 94a, 94b at each end with holes for receiving the pins 93,95. The short extension member 76 is of a U-shape configuration and the longer members 75 is of a rectangular configuration. The connecting rod block 94b and member 75 are positioned between the sides of the short member with the pin 95 extending therethrough. The longer member 75 is connected at the other end by the pin 83 to the lower link 70.

The lift spring means 72 comprises two helical springs 72a, 72b mounted in a T-shape yoke 96 pivotally connected to the pin 90 mounted in the two sheet metal pieces 44a, 44b of the support member. At the lower link 70 the helical springs 72a, 72b have hooks catching the pin 83.

The trajectory of the discharged crop is at an upward angle changing slightly on changes in the contour of the ground and either engages the lowered swathing baffle or if the swathing baffle is raised as indicated by the dotted line in FIG. 3 the cut crops enter the windrow-forming means where it is formed into and discharged as a windrow. The center of this trajectory is on the upper portion of the swathing baffle or the entrance to the windrow-forming means. In FIGS. 1 and 3 the header is shown at ground level. The conditioning rolls 12,13 are above the lower links and the plane C of the axes extends through the lower links. The bite of the conditioning rolls is approximately on the same level as the upper links. As the header moves up and down over a limited range the upper and lower links of the suspension assemblies move the header so that the discharged crops engage the swathing plate or enter the windrow shields over substantially the same area. The area of contact of the rolls with the crop material moves up and down over an arc moving towards the tractor on upward movement while maintaining the upward trajectory. The plane of the axes of the rolls tilts more on lowering of the header increasing the angle to the vertical. Thus the trajectory of the discharged crop engages over substantially the same area over the same over the range of positions of the header.

The suspension assemblies are transversely spaced approximately the same as the frame members and support the header to form a crop-transmitting space from said conditioning rolls to the swathing baffle or windrow-forming means and between the frame members and suspension assemblies The header is transversely longer than the span of the wheels and the conditioning rolls extend across the header. The discharge from the conditioning rolls has a greater width than the distance between the frame members. In order to direct the side cut crops into the crop-transmitting space crop-deflecting means are provided on the sides of the header and on the suspension assemblies.

Crop Deflecting Means

The crop-deflecting means are deflection plates 120 on the header and deflection shields 121 on the suspension assemblies. Deflection plates 120 and deflection shields 121 are at an angle to the direction of movement of the self-propelled harvesting machine and guide the flowing discharged crop material at the side into the windrow shields or against the swathing baffle. The deflecting plates 120 are mounted on the sides of the header slightly to the rear of the crop-engaging sides or bite of the rolls and are bent inwardly from the sides and have a slightly flared shape to deflect the cut condition crop material discharged at the ends of the conditioning rolls inwardly into the deflecting shields. The deflecting shields 121 (FIG. 4) are of a generally U-shape having a longitudinally extending vertically extending backing plate 123 and upper and lower confining plates 124,125 extending generally perpendicular thereto. The deflecting plate 120 overlaps with the backing plate 123 of the deflection shield and the cut crops issuing from the ends of the rolls engage the backing plate and are deflected inwardly since the backing plate 123 is at an angle to the direction of discharge of the cut material and the direction of movement of the self-propelled harvesting machine.

The backing plate 123 of the deflecting shield extends at an angle longitudinally to the harvesting machine and from back of the deflecting plate 120 on the side of the header inwardly beyond the frame or casing member 44. The deflecting member in the operating position is tilted downwardly towards the conditioning rolls so that material discharged by the conditioning rolls engages the backing plate. The backing plate is attached to the upper link 71 by flat bracket 126 welded to the curved portion of the upper link adjacent to the wheel and by forming forward L-shaped bracket 127 extending generally perpendicular to the backing plate and welded to the forward portion of the upper link. The backing plate is attached to these brackets. At the rear end the deflecting shield has an extension plate 129 positioned between the flat bracket 126 and the backing plate for extending the backing plate when the swathing baffle is raised and the harvesting machine is in the windrowing forming condition. The extension plate is L-shaped to extend underneath the confining plate 125 and has slots 130 permitting the connective sliding of the extension. The deflecting shields are different. On the left-hand side the deflecting shield has a longer upper confining plate 124 than the deflecting shield (not shown) on the right side. The upper confining plate on the left is longer to isolate the power takeoff shaft 24 from the discharged crops. The power takeoff shaft extends from the header drive housing 22 at the center of the tractor to the drive pulley 23 on the left side. The lower confining plates isolate the lift springs from any stray crop material. Thus the crops issuing from the conditioning rolls at the ends are directed inwardly into the crop-arranging means.

Conclusion

It is thus seen from the foregoing description that the lower link 70, the triangular extension members 75,76 and the lift springs 72 are positioned below the conditioning rolls 12,13 and the trajectory T of the discharged crops. Thus these elements do not interfere with the delivery of the cut crops to the crop-arranging means. The upper link 71 is pivotally connected between the walls of the frame member and adjacent to the outer wall 44b and is curved around the wheel to provide space for the deflecting shield. Thus the upper and lower link pivotally mount the header on the frame members without interference with the delivery of the cut crops to the crop arranging means. The links also pivotally support the header so that on movement through the range of cutting positions, the header projects the plane tangential to the roll bite at the upper portion of the swathing plate. Thus as the harvesting machine moves across the field and the header moves up and down the crops are discharged from the header to engage the swathing plate for deflection downwardly between the wheels to form the crops into a thin swath. When the harvesting machine is in the windrowing position with the swathing plate raised the discharged crops enter the window shields with substantially the same trajectory over the range of the cutting position and the windrow shields handle the cut crop without being affected by variations in the position of the header.

Another feature of this invention is the positioning of the header close to the tractor with the operator's platform projecting over the back end of the header. The upper and lower links and lift springs are compactly arranged with the lift springs positioned between the upper and lower links substantially suspending from the pivotal point of the upper link on the header. The lower link extends underneath the header and the upper link is pivotally connected to the frame member rearwardly of the periphery of the drive wheels and vertically intermediately of the header. In the raised transport position of FIG. 2 the header is raised above the upper links. The hydraulic lift is positioned underneath the operator's platform and rearwardly of the forward periphery of the wheels and extends downwardly and above the lower link and connected to the extension members of the lower link. This rearward positioning of the hydraulic lifts permits the closer positioning of the header to the tractor.

While this invention has been described in connection with a single embodiment, it will be understood that this embodiment is capable of modification and that this application is intended to cover any variations, uses, or adaptations following, in general, the principles of the invention and including such departures from the present disclosure as come within known or customary practice in the art to which the invention pertains, and as fall within the scope of the invention or the limits of the appended claims.

We claim:

1. A self-propelling agricultural harvesting machine comprising:
    a tractor main frame having two transversely spaced vertically extending frame members and having crop-arranging means generally between said frame members and spaced from the ground;
    a header having means for cutting crops, ground-engaging means for supporting said crop-cutting means in crop-cutting relation and means for conditioning crops received from said crop-cutting means and for discharging conditioned crops rearwardly and upwardly to said crop-arranging means;
    two transversely spaced suspension assemblies pivotally attached to said respective frame members and said header for supporting said crop-conditioning and discharge means over a range of crop-cutting and discharge positions with the discharge crop received by said crop-arranging means at substantially the same area over the range of crop-cutting and discharge positions.

2. A self-propelled agricultural harvesting machine as set forth in claim 1 wherein each of said suspension assemblies has an upper link and a lower link extending generally longitudinally to said machine, said links being pivotally connected to said respective frame members and said header, said lower links extending underneath said crop-conditioning means and clear the trajectory of discharged conditioned crops.

3. A self-propelled agricultural harvesting machine as set forth in claim 2 wherein said upper links are curved transversely outwardly from said respective frame members and pivotally connected to said header at a greater distance than the transverse length of said crop-conditioning means and discharge.

4. A self-propelled agricultural harvesting machine as set forth in claim 2 wherein said upper and lower links and said crop-conditioning and discharge means are positioned so that the trajectory of the discharged conditioned crops is at an upward angle.

5. A self-propelled agricultural harvesting machine as set forth in claim 3 wherein said upper links are at approximately the same level as the bite of said conditioning and discharge means.

6. A self-propelled agricultural harvesting machine as set forth in claim 2 wherein lift springs are provided connected to said respective upper links adjacent to said header and the respective pivotal connections of said upper links to said header.

7. An agricultural harvesting machine as set forth in claim 2 wherein hydraulic lifts are mounted on the front of and in the plane of said respective frame members at an angle to the horizontal and in the plane of said respective lower links and having means for connecting said hydraulic lifts to said respective lower links for raising said header to an inoperative transport position.

8. An agricultural harvesting machine as set forth in claim 2 wherein said crop-conditioning means are two conditioning rolls rotatably mounted in said header and extending across said header with the plane of the axis of rotation of the rollers tilted slightly forward to the vertical and extending through said lower links.

9. A self-propelling agricultural harvesting machine comprising:
    a tractor main frame having two transversely spaced vertically extending frame members with drive wheels on the outer ends thereof and having crop-arranging means generally between said frame members and spaced from the ground,
    a header having means for cutting crops, ground-engaging means for supporting said crop-cutting means in crop-cutting relation and means for conditioning crops received from said crop-cutting means and for discharging conditioned crops rearwardly against said crop-arranging means,
    two transversely spaced suspension assemblies pivotally attached to said respective frame members and said header to form a crop-transmitting space from said crop-conditioning means rearward to said crop-arranging means and supporting said header over a range of crop-cutting relations with the discharged crops passing upwardly and rearwardly through said space and approach said crop-arranging means in substantially the same transverse area over the range of the crop-cutting relations.